W. L. Gilroy.

Weather Strip.

No. 3,174. Reissued Oct. 27, 1868.

WITNESSES.

E. W. Griffin.

D. Clagett.

INVENTOR.

W. L. Gilroy.

per J. J. Greenough Atty

UNITED STATES PATENT OFFICE.

E. S. TORREY AND J. TORREY, OF NEW YORK, N. Y., ASSIGNEES OF WASHINGTON L. GILROY.

IMPROVED WEATHER-STRIP.

Specification forming part of Letters Patent No. 74,077, dated February 4, 1868; reissue No. 3,174, dated October 27, 1868.

*To all whom it may concern:*

Figure 1:
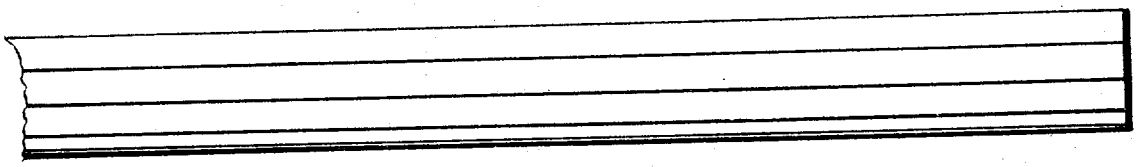
Figure 2:
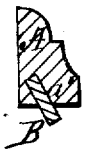

Be it known that WASHINGTON L. GILROY, of Philadelphia, in the State of Pennsylvania, did invent a new and useful Improvement in the Construction of Weather-Strips, composed of wooden moldings, or their equivalent, and India rubber, or its equivalent, for windows, doors, &c.; and we, E. S. TORREY and J. TORREY, of the city, county, and State of New York, assignees in full of the said WASHINGTON L. GILROY, do hereby declare and ascertain the said improvements as follows:

Figure 1 representing a front view of the weather-strip; Fig. 2, a transverse sectional view in the accompanying drawing.

In weather-strips made before the present improvements, the elastic material has been inserted in one of two ways, namely, perpendicular to the face of the wooden molding, or in a loop or tube form. These are well known, and we need not, therefore, more particularly describe them. These modes of construction having serious objections to urge against them in practical use, the first improvement is to obviate them, which it most effectually does; and the second improvement is in the mode of fastening the elastic medium into its wooden matrix by means of cement, instead of tacking, as has always before been done, and which is peculiarly objectionable in the slender, light strips most desirable for this purpose. Instead of inserting the flat, straight, elastic strips into the wood at right angles thereto, as above remarked, they are inserted at an angle of forty-five degrees, more or less, so that the portion that projects beyond the surface of the strip acts as an elastic readily-yielding spring, that will fit surfaces that are quite unequal, and the strips themselves need not be so accurately cut or inserted to be more effective than those that do not incline.

There is an inclined saw-kerf, or narrow deep groove, cut into the wooden strip A, at *w*, and the India rubber, B, is put therein, and secured with a suitable cement. It will be noticed that the light slim molding would be weakened by this groove *w*, and that, if the rubber were pinned or nailed into it, the molding would be still more weakened. Therefore, cement is used for the double purpose of more effectually uniting the rubber B and molding A, but also for strengthening and solidifying the molding.

Having thus fully described the improved construction of weather-strips, composed of rigid strips of wood and elastic medium,

What is claimed therein, is—

1. The insertion of a flat elastic strip into a molding, such as above described, in an inclined position to its surface, as herein set forth.

2. Also, affixing said elastic medium into the groove in the rigid molding by means of suitable cement, as and for the purposes specified.

E. S. TORREY.
J. TORREY.

Witnesses:
FRANCIS WASHBURN,
JOHN BUTCHER.